April 24, 1951  H. CARSON ET AL  2,550,529
CONTROLLABLE PITCH PROPELLER
Filed Nov. 11, 1944  4 Sheets-Sheet 1

INVENTORS
Howard Carson.
BY Richard E. Moore.
their ATTORNEYS

April 24, 1951     H. CARSON ET AL     2,550,529
CONTROLLABLE PITCH PROPELLER Filed Nov. 11, 1944     4 Sheets-Sheet 2

INVENTORS
Howard Carson.
Richard E. Moore
their ATTORNEYS

Patented Apr. 24, 1951

2,550,529

UNITED STATES PATENT OFFICE 2,550,529

CONTROLLABLE PITCH PROPELLER

Howard Carson and Richard E. Moore, Dayton, Ohio, assignors to General Motors Corporation, Detroit, Mich., a corporation of Delaware Application November 11, 1944, Serial No. 562,960

19 Claims. (Cl. 170—160.21)

This invention relates to a variable pressure hydraulic system for the control of pitch of propeller blades in an aircraft propeller.

The principal object of the invention is to provide a system and mechanism in which a pump or pressure creating means operates to produce a pressure and is controlled by the pressure necesary to maintain the system in equilibrium, and to actually cause an operative change when called upon.

Another object of the invention is to provide a hydraulic system and mechanism that will operate to provide at all times a material excess of fluid pressure for operating under all conditions required.

Another object of the invention is to provide a fluid pressure control system in which a potential of low pressure is supplied for normal propeller operation, and in which a variably higher pressure is available for effecting control where the conditions demand or indicate that a force higher than normal is required or desirable.

A further object of the invention is to provide a fluid pressure control system in which a variably increased force is applicable for a single control function.

A further object of the invention is to provide a fluid pressure control system in which a variably increased force is applicable to either of two opposed controlled functions.

Another object of the invention is to provide a fluid pressure control system in which either one of two distinct pressure forces are applicable to the control functions depending upon the demand of elements or units to be controlled.

Further objects and advantages of the present invention will be apparent from the following description, reference being had to the accompanying drawings wherein a preferred embodiment of the present invention is clearly shown.

In the drawings:

Fig. 3 to Fig. 6 inclusive show alternate methods of accomplishing variable pressure control in a governing system. In Fig. 3, the variable pressure control is applied to one control passage only of the system, while Fig. 4 applies the variable pressure control to both control passages. In Figs. 5 and 6, the pressure control system applies the increased control force by substantial increments of pressure, Fig. 6 applying the force from one controlled passage, while Fig. 5 is dual operating in that it applies the added pressure from either one of two controlled passages.

Figs. 7 to 13 are structural views showing the features of the method of Fig. 3 embodied in an existing and currently operated aircraft propeller mechanism, Fig. 7, being in substance a longitudinal section through the torque unit, blade socket, and regulator unit of a propeller mechanism, substantially as indicated by the line and arrows 7—7 of Fig. 8.

Fig. 9 is an enlarged sectional view through the regulator substantially as indicated by the lines and arrows 9—9 of Fig. 8.

A variable pressure hydraulic system as applied to the control of a constant speed propeller may be defined as one in which the pressure at which the pump operates is controlled by the pressure necessary for maintaining the system in equilibrium or for actually causing operation of propeller control mechanism.

As the forces to be overcome in propeller control, change from the condition under which very little pressure is required for operation, to the condition where very high pressure is required, it can be seen that a distinct advantage is obtained if it is not necessary to operate the pump at all times at the maximum pressure required under extreme conditions. In the present type of propeller using a constant pressure hydraulic system the system operates continuously at the maximum pressure ever required and is relieved only slightly at lower speeds due to the centrifugal effect of the pressure control valve.

Figures 1, 2:
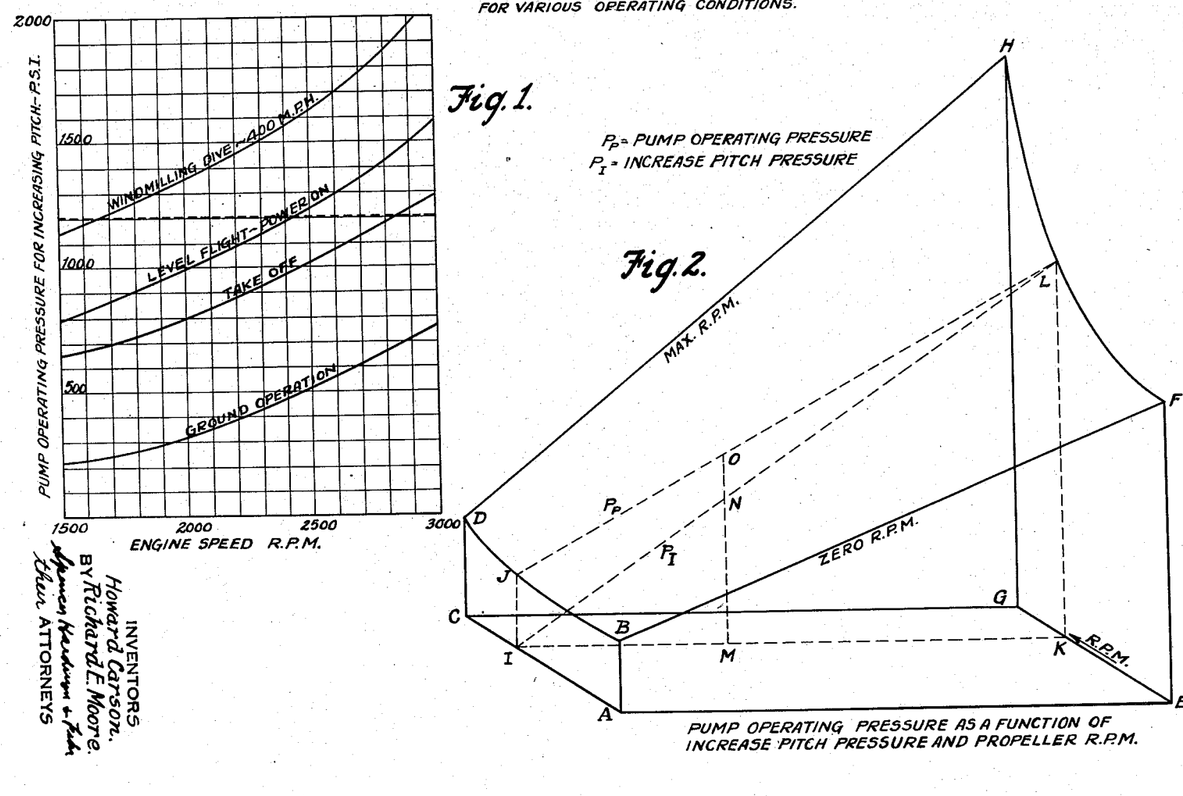
Fig. 1 is a curve showing the needs of fluid pressure for accomplishing pitch control changes in one type of propeller.
Fig. 2 is a three dimensional curve giving the values of pressures at the governor distributing ports of a governor unit in one type of propeller.

In order to establish that the constant pressure hydraulic systems as used up to this time, are inefficient and can be improved upon, information on pressure required for operation of one type of propeller under different flight conditions is presented in Figure 1. The curves of this figure show the pressures required to increase pitch for the flight condition of windmilling in a dive at 400 M. P. H., level flight with power on, take-off and ground running, respectively. The pressures all increase with rotational speed of the propeller as shown.

From Figure 1, it can be seen that high pressure is only required for unusual flight conditions under which the propeller will be operating for only a small fraction of the total time. It is difficult to set an exact figure but it can safely be estimated that 90 percent of the operation of the propeller will be in the pressure region below 1200 p. s. i., as indicated by the dotted line of Figure 1.

It can, therefore, be seen that control of the propeller under normal conditions of operation can be accomplished with a pressure only slightly greater than one-half of the pressure that must be provided under the worst condition of operation (windmilling at high airspeed and maximum R. P. M.).

With a constant pressure system, the pump operates at a substantially constant pressure, and the governor throttles or reduces this pressure to the amount required for operation under the particular condition of flight. The pressure at which the pump operates may be controlled by the setting of a pressure control valve. This setting must be such as to provide the maximum pressure that will ever be required for operation of the propeller. Except for operating conditions which involve very rapid rates of pitch change, where the propeller blades are moving at the same rate as the pump output, this maximum pressure will be maintained in the system.

Figure 3:
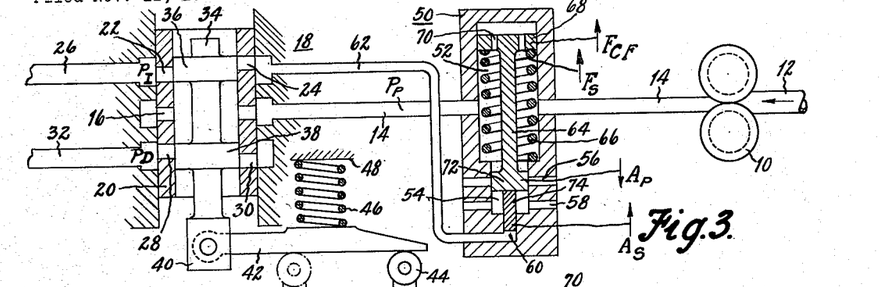

With the variable pressure system shown schematically in Figure 3, the pump pressure is controlled by the requirements of operation as indicated by the governor. As can be seen from Figure 3, the principal difference between the variable pressure system and a constant pressure system is the addition of a small secondary piston, $A_s$ which is acted upon by the increased pitch pressure $P_I$ of the system. The load resulting from the increase pitch pressure acting on the area of the secondary piston is applied to the bottom of the primary piston, $A_p$, in such a direction as to aid the spring $F_s$ and centrifugal force $F_{CF}$ tending to keep the valve closed.

By using a pressure control system as shown in Figure 3, it is possible to control the pump operating pressure and maintain this pressure at a certain ratio to the pressure actually required to operate the propeller. With such a system the normal operating pressure will always be substantially lower than the maximum pressure required under the extreme flight condition of the propeller windmilling with the airplane in a high speed dive. As applied to the present constant pressure propellers, such a system would result in the pump operating below, for example, 500 p. s. i. instead of 1200 p. s. i. for all normal flight conditions, and being raised to 1200 p. s. i. only when necessary to overcome the blade forces encountered in the windmilling condition.

The lowering of the operating pressure for normal operation will result in less power input to the regulator unit and consequently less heat being generated through the dissipation of this power. Operation at lower pressure will also result in lower loads being imposed on the pump, control valves, seals, gaskets, etc., with resulting longer useful life of these parts. It has been found that close control of speed with a centrifugal governor becomes increasingly difficult as the operating pressure is increased. With the variable pressure system, governing for normal operation will be done at a reduced pressure and accurate speed control maintained as in the present constant pressure system.

The use of such a system greatly simplifies the design of all the units comprising the control mechanism. It can be seen that in the case of the hydraulic pump, for example, that the design is simplified if operation at peak pressures is required for only short intervals. In general, overloading for short intervals is very possible with a pump of given design where continuous operation at maximum pressure would result in wear and reduced life.

*Methods of accomplishing pressure control*

Figures 3, 4, 5 and 6 show alternate methods of accomplishing pressure control in a governing system. The system shown in Figure 3 appears at this time to be the most desirable for use in propellers with a variable pressure control for increase pitch only. The system shown in Figure 4 operates on the same principle as the system shown in Figure 3 with the additional advantage that it operates for both the increase and decrease pitch condition. In the present propeller designs it appears as though variable pressure control, or pressure loading, on decrease pitch is unnecessary, as the propeller blade forces tending to decrease pitch are sufficient to cause satisfactory operation.

Figure 4:
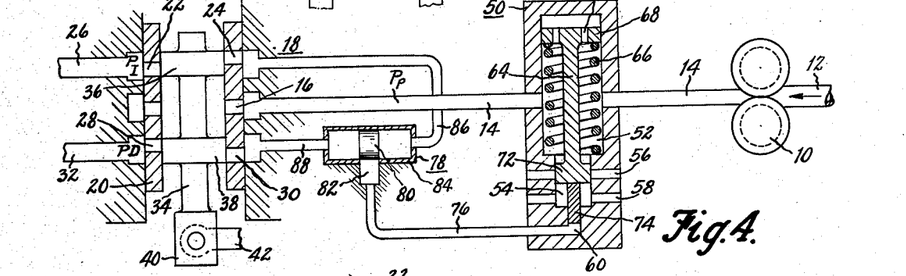
Figure 5:
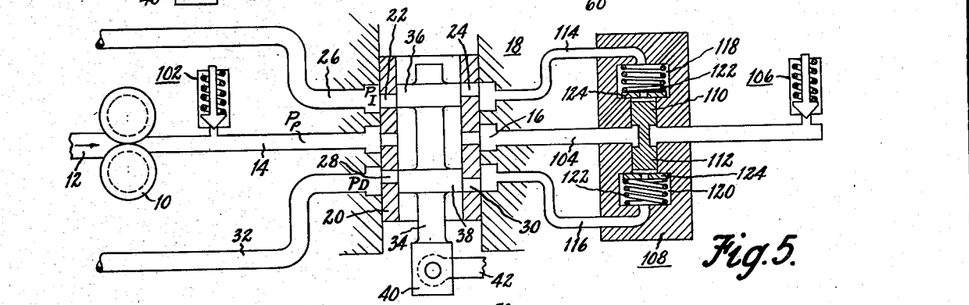
Figure 6:
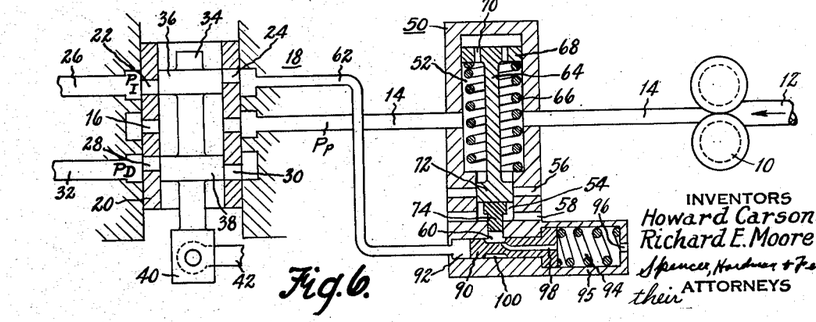

The pressure control systems as shown in Figures 3 and 4 continuously control the pressure of the system under all conditions of operation. Those shown in Figures 5 and 6 are essentially "two-pressure" systems, where a distinct shift is made from one pump operating pressure to another at a predetermined value of the pressure required for operation of the system. These "two-pressure" systems as shown in Figures 5 and 6 are more complicated in construction than those shown in Figures 3 and 4, but are of value in systems where continuous control of pressure is undesirable or unnecessary.

As can be seen in Figure 3, this system operates on the principle that a measure of the pressure required to overcome the forces acting in the system is obtained from $P_I$ (increase pitch pressure) and used to control the pump pressure by means of applying this pressure to the area $A_s$ of the pressure control valve. With this system, then, the higher the pressure $P_I$, the higher the pump pressure will be since the force determined by the pressure $P_I$ and the area $A_s$ acts to aid the spring and centrifugal forces tending to hold the valve closed.

With a view to knowing the pressures acting in the system under all conditions of operation, the following analysis may be carried out, with reference to Figure 3 where the symbols represented are defined as:

$P_P$ = pump pressure—p. s. i.
$P_I$ = increase pitch pressure—p. s. i.
$P_D$ = decrease pitch pressure—p. s. i.
$A_p$ = area of primary pressure control valve piston—ins.$^2$ $A_s$ = area of secondary pressure control valve piston—ins.$^2$ $F_s$ = spring force acting on primary pressure control valve piston—lbs.

$F_{C.F.}$ = centrifugal force acting on pressure control valve pistons—lbs. (This force acting in the direction shown in Figure 3.)

The following pressures may be calculated from the conditions of minimum and maximum pressures in the system.

$P_{DS}$ = minimum decrease pitch pressure (under static conditions).

$$= \frac{F_s}{A_p} (= AB \text{ on curve of Fig. 2})$$

$P_{DM}$ = maximum decrease pitch pressure (at maximum rotational speed).

$$= \frac{F_s + F_{C.F.}}{A_p} (= CD \text{ on curve of Fig. 2})$$

$P_{IS}$ = minimum increase pitch pressure (under static conditions).

$$= \frac{F_s}{A_p - A_I} (= EF \text{ on curve, Sheet 1})$$

$P_{IM}$ = maximum increase pitch pressure (at maximum rotational speed)

$$= \frac{F_s + F_{C.F.}}{A_P - A_I} (= GH \text{ on curve, Sheet 1})$$

From these four pressures the three dimensional diagram giving the relationship between $P_I$ and $P_P$ has been drawn on Fig. 2. The lines BD and FH on this diagram represent the square curve giving the increase in pressure due to centrifugal effect of the valve for decrease pitch pressure and increase pitch pressure.

At any intermediate speed between maximum and minimum R. P. M. as represented by points J and L on the R. P. M. curve, the increase pitch pressure is represented by line IL and the corresponding pump pressure by the line JL. As an example of one condition of operation of the propeller at the speed represented by points J and L assume that it is necessary to have an increase pitch pressure of magnitude MN to operate the mechanism or maintain equilibrium conditions. If this line MN is extended to intersect the line JL then the pressure at which the pump will be operating under this condition will be represented by the magnitude of the line MO. The difference of the pressure MO and MN will be equal to the pressure drop across the governor ports.

As the lines IL and JL converge at the higher pressures the system will be stable and there will be one definite pressure for each condition of operation. The maximum pressure available for increasing pitch at any speed will be represented by the line FH where $P_I = P_P$. The maximum pressure available for decreasing pitch at any speed will be represented by the line BD. This will be the pump operating pressure when the propeller is on the low pitch stop.

Proceeding to the structural embodiment of the foregoing, and first with respect to Figs. 3 to 6 inclusive, 10 indicates a pump or pressure developing means having an inlet 12 and discharging into a pressure line 14 always subject to pump pressure $P_P$ which is delivered to the line ports 16 in a distributor or governor valve unit 18. The governor valve unit 18 embodies a porting sleeve 20 that is provided with a set of ports 22, 24 for the increase pitch function $P_I$ in the control passage 26, and a second set of ports 28, 30 for the decrease pitch function $P_D$ in the control passage 32. A piston valve 34 is slidable along the bore of the sleeve 20 which is disposed radially of an axis of rotation, and has lands 36 and 38 spaced lineally thereof to coincide with and cover the two sets of ports 22, 24 and 28, 30 when the valve is in an equilibrium or balanced position. The valve plunger 34 extends radially inward to provide a yoke 40 in which is pivotally mounted a lever 42 whose free end rests upon a fulcrum 44, where it is maintained by the thrust of a spring 46 from a support 48. Centrifugal force acting upon the valve plunger 34 and lever assembly 42 if great enough rocks the lever over the fulcrum 44 to compress the spring 46, and at the same time moves the valve plunger 34 to a position where the control port 22 is connected directly with the pressure supply port 16, but if overcome by the spring force the valve plunger 34 moves inward to connect the control port 28 with the pressure supply 16. For selecting the speed level at which the governor means will establish equilibrium, the fulcrum 44 is movable along the length of the lever 42 so as to vary the moments of force applied by centrifugal force and spring force. The foregoing general description is greatly amplified in the patent to Blanchard and MacNeil 2,307,102, and is applied with equal emphasis to the present structure thus far specifically described.

In Fig. 3, a pressure control valve 50 is inserted in the pump delivery line 14 in such manner as not to interfere with the flow through that line but to be responsive to the pressure potential thereof at all times. The valve 50 embodies a main chamber 52 subject at all times to the pressure of pump delivery line 14, a primary piston chamber 54 with outlets 56 and 58, and a secondary piston chamber 60 that has a fluid connection 62 leading to the pitch increase control passage 26 and thus always in communication with the ports 22, 24 of the porting sleeve 20. Housed within the chamber 52 there is a centrifugally responsive plunger 64 assisted in outward movement by a spring 66, a large diameter head 68 having damping bleeds 70 therethrough to eventually equalize the fluid pressure on both sides of the head, and a small diameter head 72 providing a primary piston always exposed to pump pressure, and movable along the primary piston chamber 54 to cover and uncover the outlets 56. The outlets 58 are relief passages for the chamber 54. Engageable with or integrally joined to the primary piston there is a secondary piston 74 of still smaller diameter that is slidable in the secondary chamber 60 and thus always subject to the pressure of the control passage 26.

In Fig. 4 the secondary piston chamber 60 has a fluid connection by tube 76 with a shuttle valve unit 78 in which a piston 80 is positioned by the differential of the two pressures in passages 86 and 88 connecting with the control ports 22, 24 and 28, 30, whereby the secondary piston chamber 60 is always subject to the pressure applied at the control ports depending on which is the higher pressure. In this shuttle valve unit the fluid connection 76 opens into a chamber 82 which is just covered by the piston 80 when it is in the middle or equilibrium position. The piston 80 is freely movable from end to end of the cylinder 84 in response to application of pressure through 86 or 88, and consequently will be in the middle position as shown when the piston valve 34 is in the equilibrium position, or when the pressures in passages 86 and 88 are the same.

In Fig. 6 the arrangement is much the same as in Fig. 3, except that a lockout valve 90 is inserted in the connection between the secondary piston chamber 60 and its fluid connection 62 with the increase pitch control port. The lockout valve 90 slides in a bore or cylinder 92 against a spring 94 in an extension 95 relieved to the outside at 96 to communicate with an axial passage 98 leading to an annular groove 100. Here, the spring 94 normally closes the communication between the chamber 60 and the passage 62, but is operable when the pressure in the control passage is applied with sufficient force against the part 90 to open such communication.

In Fig. 5 the pressure control valve is dispensed with insofar as the described structure is concerned, and is replaced by a high pressure relief valve 102 in the line 14 at the outlet of the pump, while an extension of the pump pressure line 14 is made at 104 to a low pressure relief valve 106. Across the extent of this line 104 there is a double acting selector or lock-out valve 108 having opposed heads 110 and 112 joined by a stem of reduced section that normally permits fluid passage along the line 104. However the heads 110 and 112 are exposed to the pressure at the control ports 22, 24 and 28, 30 respectively by passages 114 and 116 connected with chambers 118, 120 in which are housed springs 122 and apertured discs 124, the springs and discs normally keeping the heads 110, 112 equally spaced for flow through the line 104. Upon application of fluid pressure at either of the control ports, that pressure is also applicable through the passages 114 or 116 as the case may be to push the head 110 or 112 to an intercepting relation across the line 104. When that is done the low pressure relief valve 106 is non operative and the control force is limited only by the setting of the high pressure relief valve 102.

Tracing the related actions and specific operation of the elements shown in Fig. 3, should be sufficient to illustrate the operation of the forms of invention shown in Figs. 4, 5 and 6 as well. It is to be understood of course that the valve units 18 and 50 are so mounted on the propeller mechanism that centrifugal force will be applied to the elements 34 and 64 tending to move them radially outward from the axis of rotation, as will later appear from the description with respect to Fig. 8. As shown in Fig. 3, centrifugal force acts upon the elements 34 and 64 towards the top of the sheet. With respect to the governor valve 18, the plunger 34 is articulated to the lever 42 that is constantly urged radially inward by the spring 46 tending to rock the lever over the fulcrum 44, thereby opposing the centrifugal force acting upon the valve plunger. Movement of the fulcrum 44 along the lever 42 determines the relation of centrifugal and spring forces acting upon the plunger and its connected lever. When those forces are in equilibrium the lands 36 and 38 will cover the control ports 22, 24 and 28, 30 substantially as shown in Fig. 3, and the propeller will be operating "on speed." If the force of the spring 46 dominates, then the valve plunger 36 will occupy a position radially inward (downward) of that shown, and the propeller will be operating at "underspeed." If the centrifugal force acting upon the plunger and lever dominates, then the valve plunger 36 will occupy a position radially outward (upward) of that shown, and the propeller will be operating at "overspeed." The valve plunger 34 in moving along the bore of the porting sleeve 20 from its equilibrium position shown in Fig. 3 operates to connect either set of control ports with the pressure input port 16, so that the devices attached to either of the passages 26 or 32 will then be exposed to whatever pressure that is existent in the line 14.

The potential of the pressure existent in passage 14 is determined by the variable pressure control valve 50. Centrifugal force acting upon the plunger 64 of that valve is assisted by the force of the spring 66, which both tend to move the plunger radially outward (upward) so that the portion 72 closes off the ports 56 exhausting back to the pump intake. The chamber 52 of the valve is always open to the pressure potential from the pump 10 which pressure is applied downwardly to the area of the head 72 in opposition to the spring and centrifugal force. With the control ports of the governor valve 18 closed there is insufficient flow from the system to deplete the pressure of the pump that is being built up, and the component of pressure force applied to the area of 72 soon overcomes the combined spring and centrifugal forces, and the plunger 64 moves radially inward to uncover the outlets 56, which limits the pressure in the line 14 to a relatively low value for equilibrium conditions of the governor valve 18. The head 72 opens more or less the ports 56 as the pressure in the chamber 52 and line 14 rises or falls, but always maintains a sufficient head in the bore of porting sleeve 20 for application to the control ports upon movement of the plunger 34. When the valve 34 moves downward during an underspeed condition the pressure in 14 and the bore of sleeve 20 is applied to control ports 28, 30 for flow along control passage 32. That flow momentarily reduces the pressure in 14 and consequently 52 which relieves some of the pressure applied to the end area of 72, resulting in a radially outward movement of the plunger 64 to at least partially cut off the outlet at 56. Thus the pressure in 14 is immediately raised to meet the needs of force application through the control passage 32.

When the plunger 34 moves radially outward (upward) during an overspeed condition the pressure in 14 and the bore of sleeve 20 is applied to control ports 22, 24 for flow along the control passage 26. The momentary reduction by reason of flow is immediately reflected to the area of the head 72 and acts in a similar manner as just described to raise the pressure to be applied. That pressure to be applied in this instance is also increased through a further control effected by the valve unit 50. Coincident with directing pressure in 14 and 20 to the control passage 26 it is also applied to the fluid connection 62 which leads to the underside of secondary piston 74 aiding the centrifugal and spring force moving plunger 64 radially outward. Any outwardly directed force upon the plunger 64 tends to raise the blow off point at which the pressure in 52 will exhaust through 56. In this way the pressure within the pressure source line feeding into the governor valve 18 is raised or lowered to fit the needs for power required at the ends of the passages 26 and 32.

A physical embodiment of the features outlined by Fig. 3 is illustrated in Figs. 7 to 13 inclusive, in which 130 indicates an engine nosing or gear casing from which extends an engine driven propeller shaft 132 drivably mounting a propeller hub 134 by means of the usual splines and nut 136. The hub provides a plurality of blade sockets 138 within which are journalled for pitch shifting movement blades 140 due to the bearings 142 and nut 144. Each blade encloses in its hollow root a hydraulic torque unit 146 comprising a cylinder 148 mounted on a blade driving gear 150 which has rotatable driving relation with the blade 140. The cylinder 148 encloses a piston 152 that divides the cylinder into two opposed chambers 154 and 156 each connected with one of the pressure controlled passages 26 or 32 hereinbefore mentioned. As shown, the chamber 156 is connected by a fixed tube 158 slidably extending through the piston 152 with a passage 160 that communicates with the controlled passage 32 at 162, and it is obvious that similar connection between the chamber 154 and the controlled passage 26 may be made at 164. The piston 152 has a doubled spline connection, one with the interior of the cylinder at 166 and the other with the exterior of a fixed spindle 168 at 170. The spindle 168 is rigidly mounted on the hub 132 by means of a screw device 172 which also operates to secure the tube 168. Thus, movement of the piston 152 axially of the cylinder 148 will effect rotation of the cylinder and consequently rotation of the blade 140 depending on which of the chambers 154 or 156 the dominating fluid pressure is applied to.

Figures 7, 9:
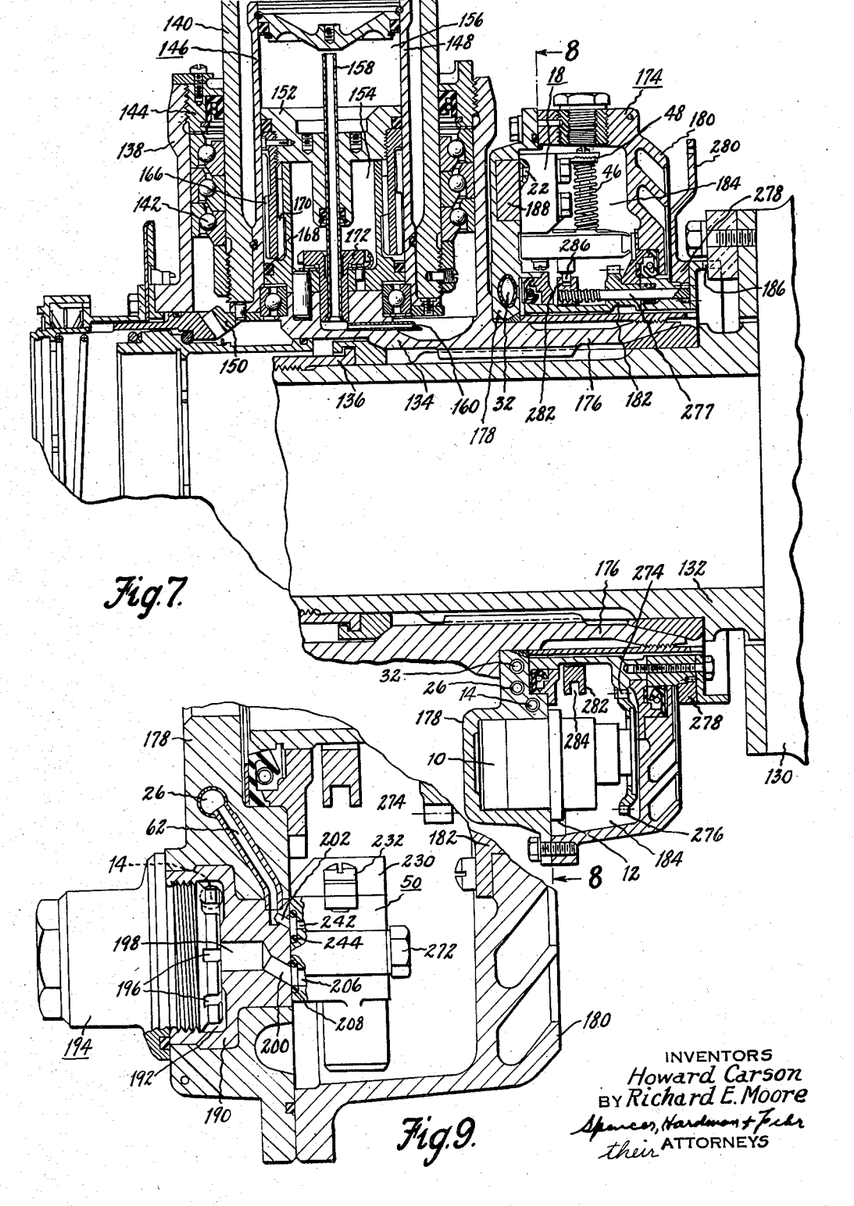

The application of fluid pressure to one side or the other of the piston 152 is controlled by a regulator 174 that is mounted on an aft tubular extension 176 of the hub 134. The regulator comprises an annular plate 178, a cover 180 and an adapter assembly 182 that provide an annular sealed chamber 184 constituting a reservoir for storing a quantity of fluid pressure medium, and housing the elements of the control mechanism. All of the regulator except the adapter assembly rotates with the propeller, while the latter is restrained from rotation by means of a lug and notch engagement 186 with a fixed part of the supporting structure, such as the engine nosing or gear casing 130. The plate 178 in this form is cast to embody tubes providing the passages 14, 26, 32, and 62 with such lateral openings as necessary to make fluid connection with the control devices or units. Juncture blocks are supplied where desirable for mounting control units, and should include 188 for mounting of the governor valve unit 18, and 190 for the mounting of the pressure control unit 50.

Figures 8, 10, 11, 12, 13:
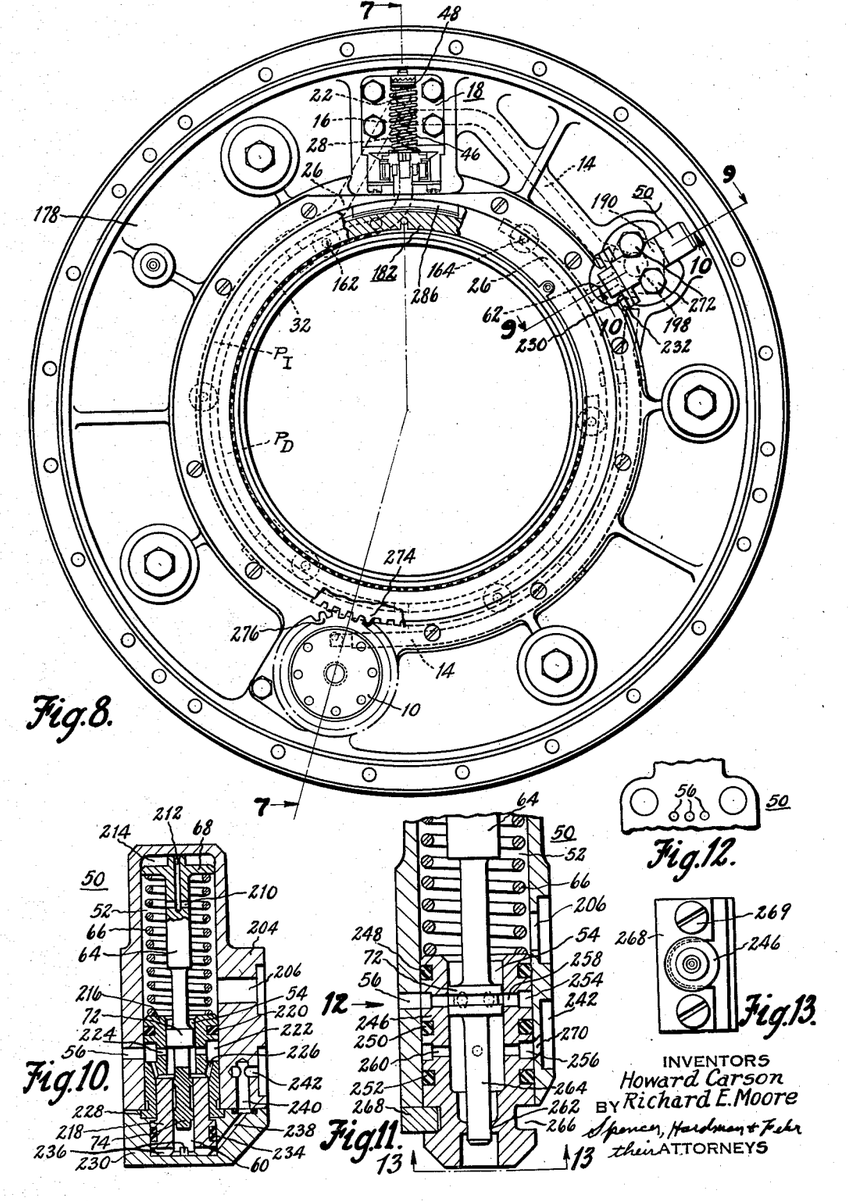
Fig. 8 is a transverse sectional view through the regulator unit after the cover member has been removed, substantially as indicated by the lines and arrows 8—8 of Fig. 7.
Fig. 10 is a longitudinal section through one type of pressure regulator valve embodied in the system, it being a view substantially as indicated by the lines and arrows 10—10 of Fig. 8.
Fig. 11 is a similar sectional view, on an enlarged scale, of a modified form of the valving portion of the control valve.
Fig. 12 is a fragmentary side view of the valve unit substantially as shown by the arrow 12 of Fig. 11.
Fig. 13 is an end view of the same as indicated by the line and arrows 13—13 of Fig. 11.

One example is shown in Fig. 9 where the block 190, presents a cup-like recess 192 for reception of a filter unit 194 threaded therein and having entry notches 196 for fluid coming into the recess from the end of 14 supplying the pump pressure. A central drill-way 198 leads from the interior of the filter unit and communicates with the other branch of the passage 14 leading to the governor valve unit 18 as shown in Fig. 8. A branch 200 slants radially outward to make connection with a pump supply port 206 to the pressure control valve 50, while an additional passage 202 makes juncture with the secondary piston chamber 60 and the passage 62 connecting to the pitch increase line 26.

The physical embodiment of the pressure control valve suitable for applying the variable pressure according to Fig. 3 is shown in Figs. 10 to 13 inclusive. Where possible the same reference characters have been used to illustrate the equivalent details of structure, and it therefore remains only to describe the particular differences.

In Fig. 10 the housing body provides a surfaced boss 204 counter drilled at 206 to receive a seal ring 208, shown in Fig. 9, and make fluid connection between the interior 52 of the housing and the passage 200 of the juncture pad 190. Thus, the chamber 52 of the housing is always in communication with the pressure fluid at pump pressure through the passage elements 206, 200, 198, 194, 196 and 14. Referring to Fig. 10, that pressure is existent on one side of the primary piston 72 and on both sides of the large diameter head 68, due to the damping and equalizing passages 210 and 212 by which the damping chamber 214 is bled to and from the chamber 52. The valve unit 50 being mounted on the plate 178 on a radius of rotation, and so that the headed end 68 is radially outward, the centrifugal force of rotation $F_{CF}$, and the force of the spring 66Fs, will always be in aiding relation, and the pump pressure $P_P$ applied to the primary piston 72 from the chamber 52 will be the only opposing force. Domination of the pump pressure, when exerted, moves the primary piston radially inward against that combined force. In Fig. 10, the primary piston chamber 54 and the secondary piston chamber 60 are each provided by a separate sleeve element nesting within the bore of the member forming the main chamber 52. A spool like member 216 is axially bored to provide the chamber 54 and then enlarged to receive a sleeve 218 axially drilled to form the chamber 60. A peripheral groove about the sleeve 216 receives seal ring 220 while a second groove 222 carries cross passages 224 opening into the bore of the sleeve and thence providing communication with the outlet 56. Other drill-ways 226 extend from the groove 222 to the end face of the sleeve 218 so that the primary piston 72 will never be trapped in its return movement. The sleeve 216 is retained at the end of the chamber 52 by means of a flange 228 received in a recess of a cap 230 attached to the housing by screw devices 232. The cap also retains the sleeve 218 in position within the sleeve 216, and closes off the end of the secondary chamber. A seal ring 234 prevents leakage, and cross notches 236 in the end of the sleeve 218 provides communication between the chamber 60 and a drill-way 238 in the cap 230 that opens into a passage 240 of the boss 204 where a cross passage with expanded opening 242 houses a seal ring 244, shown in Fig. 9, and opens into the passage 202 exposed to the increased pitch pressure through passage 62.

Some modification of the structure is shown in Fig. 11, where the primary piston chamber and the secondary piston chamber are of substantially equal area. A single sleeve-like member 246 has a succession of circumferential grooves, in alternating ones of which starting from the chamber 52 have deposited therein seal rings 248, 250 and 252 designed to establish a fluid seal between the sleeve and the bore of the housing member. The intervening grooves 254 and 256 both form fluid passages and have cross bores 258 and 260 respectively opening to the central bore of the sleeve, which bore is reduced in diameter at 262 to slidably receive and guide an extension 264 of the plunger 64. A final end groove 266 is receptive of a yoke plate 268 which operates to secure the sleeve 246 in position through the agency of screw devices 269 threading into the housing body. The groove 254 communicates with the outlet ports 56, and when uncovered by the piston 72 relieves the pump pressure to the outside of the unit. The groove 256 communicates through 270 with 242 in the described manner, since the valve unit 50 is retained in proper aligned relation with the respective ports by means of screw devices 272 threading into the body of the plate 178.

Actuation of the pump 10 is effected through the agency of a toothed spur 274 carried by the relatively fixed adapter assembly 182, and thereby drives a pump pinion 276. The adapter assembly also provides a plurality of high lead screws 277 actuated by a toothed ring gear 278 oscillatable about the adapter assembly from a lever 280 that effects longitudinal movement of a control ring 282 inside of the regulator. The control ring provides a groove 284 of wavy formation, and in which rides a shoe 286 supporting the fulcrum 44 supporting the free end of the lever 42. The wavy formation of the groove effects cyclic reciprocation of the valve 34 within its porting sleeve to eliminate static friction, while the lever and high lead screws provide for establishing basic control speeds. The cyclic reciprocation of the valve is but minute, or of such small extent as not to effect an actual pitch change by the torque unit, but large enough to supply a succession of incrementally small impulses to one and then the other of the control ports. That assures that the control valve 34 will be kept shivering, so to speak, and conditioned to move to a controlling position with the least effort from a pitch shifting impulse.

Reverting to the operation of the pump, it will be constantly operated so long as the propeller is turning with respect to the engine nosing or gear casing 130 and the adapter assembly. By reason of the pressure control valve 50, the output of the pump, or rather the potential of the pump delivery line 14 will be relatively low as regards the possibilities or capacity of the pump, because flight conditions, on the average, as shown by the curves of Fig. 1, necessitate but moderate controlling forces as compared with materially greater controlling forces during short intervals of propeller operation. The pressure control valve is so constituted that the pressure system will normally be charged with a suitable low potential pressure which is sufficient to operate the torque unit for a pitch decreasing function, but will immediately be increased to a sufficient value for operating the torque unit for pitch increasing function. Thus, if a force greater than the average is required to effect working of the torque unit, the pressure system is charged with that greater force. The pressure control valve therefore controls the potential of the system in accordance with the demands of the work to be done by the torque units. The load upon the pump is thus materially reduced throughut the greater portion of its operation, and is loaded heavily only during irregular and short intervals of operation.

The advantages of operating the pump at pressures lower than the maximum are many. Since normal operating pressures of a high pressure propeller will be no greater than the pressure at which the pump operates in the present production propeller, heat generation from the hydraulic system will be no greater. Operating temperatures of the present production propeller are satisfactory in that excessively high temperatures are not encountered and yet sufficient heat is generated to provide for low temperature operation. If the heat dissipation from the hydraulic system were doubled, as it would be if the operating pressure were doubled, excessively high oil temperatures would result and auxiliary means of cooling would have to be provided.

Another advantage of operating the pump at reduced pressure is that the load imposed on the pump driving gear, bearings, seals, and the pump itself is greatly reduced for a large percentage of the total time of operation. Pumps, bearings, seals, etc., which are designed for continuous operation at 2500–3000 p. s. i. will last a lot longer if they are operated continuously at 1000–1500 p. s. i. and only required to withstand pressures of 2500–3000 p. s. i. for short intervals of operation.

Accurate speed control is considerably easier with the pump operating at pressures below 1500 p. s. i. than it is above this pressure. With a high pump pressure it is necessary to have high pressure drops across the ports of the governor. With these high pressure drops, forces are set upon the governor piston due to the high velocity oil-bleed at the ports. These forces tend to unbalance the piston and the result is erratic speed control and chattering. The higher the operating pressures, the greater are these forces and the more difficulty is encountered in obtaining accurate speed control. As all the flight conditions, where accurate speed control is necessary, are in the lower pressure region, it can be seen that more accurate speed control is possible with the variable pressure system.

It has been found that the above mentioned unbalancing forces on the governor piston can be greatly reduced with a positive overlap type of governor. This governor differs from the usual governor used on propellers up to this time, only in that a slight amount of positive overlap (.001–.003 inch) is maintained across each governor port. On the usual governor, a slight amount of negative overlap has been used in order to obtain a proportionalizing valve. It has been found, however, that an extremely good proportionalizing valve can be made with a slight amount of positive overlap when the piston is kept jittering in the cylinder. This type of valve possesses the additional advantage that very little oil flow is passed through the ports when the propeller is in the on-speed condition. This reduction in oil flow aids in reducing the unbalanced forces and results in a more stable valve than can be obtained when negative overlap is used.

While the embodiment of the present invention as herein disclosed, constitutes a preferred form, it is to be understood that other forms might be adopted, all coming within the scope of the claims which follow.

What is claimed is as follows:

1. A propeller control mechanism of the character described for use with an hydraulically adjustable propeller having a rotatable hub with blades and fluid actuated means for adjustment of the pitch of the blades, comprising, a plate rotating with the hub, pump means mounted on the plate and responding to propeller operation for providing a source of pressure fluid, a pair of fluid pressure conduits provided by the plate for supplying directed fluid pressure to the fluid actuated means, a governor valve having control ports opening into said conduits mounted on the plate and responsive to the speed of rotation of the propeller for directing the application of said fluid pressure through one or the other of said conduits, a pressure supply passage connecting the source of pressure with the governor valve, a pressure control valve carried by the plate opening into said pressure supply passage and including means for maintaining a predetermined pressure potential in said supply passage, and means for variably increasing the potential of pressure in said supply passage in accordance with the work to be done by the fluid actuated means when connected with either one of said fluid pressure conduits.

2. The combination set forth in claim 1 wherein the pressure control valve comprises a spring pressed piston arranged to move radially of the plate to respond to centrifugal force said piston having a primary area constantly exposed to the potential of said pressure supply passage and a secondary area exposable through a feed-back passage to the potential of pressure directed to one of the said fluid pressure conduits.

3. The combination set forth in claim 1 wherein the pressure control valve comprises a spring pressed piston responding to centrifugal force in aiding relation, and having a primary area constantly exposed to the potential of said pressure supply passage opposing the centrifugal and spring force, and a secondary area of said piston with passage means connecting it with a pressure conduit opposing the primary area and exposable upon directed application by the governor valve to the pressure potential of one of the fluid pressure conduits.

4. The combination set forth in claim 1 wherein the pressure control valve comprises a spring pressed piston having a primary area constantly exposed to the potential of said pressure supply passage for opposing said spring, and a secondary area with passage means connecting it with a pressure conduit opposing the primary area, and exposable upon directed application of fluid pressure to one of said fluid pressure conduits and means mounting the piston to move radially of the plate to respond to centrifugal force in assisting the spring.

5. A propeller control mechanism of the character described for use with an hydraulically adjustable propeller having a hub and a plurality of blade sockets with fluid actuated means for effecting adjustment of the pitch of the blades in each of the blade sockets comprising, a plate rotating with the hub, pump means mounted on the plate and providing a source of pressure fluid, a pair of fluid pressure conduits on the plate for supplying directed fluid pressure to the fluid actuated means, a governor valve having control ports opening into said conduits rotatable with the plate and responsive to the speed of rotation of said propeller for directing the application of said pressure fluid to one or the other of said conduits, a pressure supply passage connecting the source of pressure with the governor valve, and a pressure control valve carried by the plate and having a primary area constantly exposed to the potential of said pressure supply passage tending to reduce the pressure for maintaining a normal operating pressure, and having a secondary area with passage means connecting it with a pressure conduit in opposed relation to the primary area and exposable to the potential of either of said fluid pressure conduits upon directed application of fluid pressure thereto, for increasing the potential of pressure fluid directed to the conduits in accordance with the demands of said fluid actuated means whenever either of said pressure conduits is connected with the said source.

6. A propeller control mechanism of the character described for use with an hydraulically adjustable rotatable propeller having a hub and blades, with fluid actuated means for adjustment of the pitch of the blades, comprising, a rotating regulator including means providing a source of pressure fluid, a pair of fluid pressure conduits for supplying directed fluid pressure to the fluid actuated means, a governor valve having control ports opening into said conduits responsive to the speed of rotation of said propeller for directing said pressure fluid to one or the other of said conduits, pressure controlling means in the regulator exposed to said source for maintaining the potential of said source at a normal operating pressure, means mounting a part of said pressure controlling means radially of the regulator for responce to centrifugal force, a spring acting in assistance to the centrifugal force tending to increase the pressure above said normal operating pressure, and pressure load control means with passage means connecting it with a pressure conduit responding to the potential of said pressure source to meet the requirements of operation of the fluid actuated means as directed by the governor.

7. The combination set forth in claim 6 wherein the pressure loading control means includes a fluid pressure feed-back from one of said conduits, and a lock-out valve responding to a predetermined potential of the feed-back from said conduit for effecting a definite increment of pressure potential in said pressure source at a predetermined value of the pressure required for operation of said fluid actuator means whenever said pressure loading control means is exposed to the directed pressure.

8. A propeller control mechanism for use with an hydraulically adjustable propeller having fluid actuated means requiring normal pressure potential for effecting adjustment of blade pitch toward one end of the pitch range, and requiring an increase of pressure potential of the normal pressure potential for effecting adjustment of the blade pitch toward the opposite end of the pitch range, comprising, a rotatable regulator, means in the regulator providing a source of fluid pressure, a pair of fluid pressure conduits in the regulator for supplying directed fluid pressure to the fluid actuated means, a governor valve in the regulator having control ports opening into said conduits for selectively directing the application of said fluid pressure to one or the other of said conduits, a pressure control valve in the regulator opening into said pressure supply passage for effecting predetermined pressure potentials in the pressure source in accordance with the demands of said fluid actuated means, said pressure control valve including a port and plunger means responding to the source pressure for reducing to a normal operating pressure of fluid in said pressure source and also including a secondary piston area with passage means connecting it with a pressure conduit responsive to governor directed pressure for increasing the pressure potential to the maximum required under extreme flight conditions, the pressure increasing means including a spring biasing the plunger to close said port, said plunger having an area exposed to pressure directed to one of the conduits and a lock-out valve responding to a predetermined increment of the directed pressure for opposing the decreasing normal operating pressure.

9. A propeller control mechanism for use with an hydraulically adjustable propeller having fluid actuated means requiring normal pressure potential for effecting adjustment of blade pitch toward one end of the pitch range, and requiring an increase of pressure potential of the normal pressure potential for effecting adjustment of the blade pitch toward the opposite end of the pitch range, comprising, a rotatable regulator, means in the regulator providing a source of fluid pressure, a pair of fluid pressure conduits in the regulator for supplying directed fluid pressure to the fluid actuated means, a governor valve in the regulator having control ports opening into said conduits for selectively directing the application of said fluid pressure to one or the other of said conduits, a pressure control valve in the regulator opening into said pressure supply passage for effecting predetermined pressure potentials in the pressure source in accordance with the demands of said fluid actuated means, said pressure control valve including a port and plunger means responding to the source pressure for reducing to a normal operating pressure of fluid in said pressure source and also including a secondary piston area with passage means connecting it with a pressure conduit responsive to governor directed pressure for increasing the pressure potential to the maximum required under extreme flight conditions, the pressure increasing means includes a lock-out valve having an area exposed to the pressure directed to one of the conduits by the governor valve, and operable upon a predetermined potential of directed pressure to negative the reduction to normal operating pressure.

10. A propeller adjusting mechanism of the character described for use with an hydraulically adjustable propeller having provision within its hub for adjusting the pitch of its blades upon the application of fluid pressure thereto within a wide range of positive pitch positions and into a position of negative pitch, comprising an hydraulic regulator rotatable with the hub and providing a source of fluid pressure, a pair of control ports for supplying directed fluid pressure to the pitch adjusting provisions, a governor having control ports opening into said conduits for directing the application of pressure from said source to one or another of said control ports, and a pressure control unit opening into said pressure supply passage for regulating the pressure potential of said source in accordance with the demands of the pitch adjusting provisions said pressure control unit including an escape port and piston valve disposed radially of the regulator to be responsive to centrifugal force to close said escape port, spring means arranged to assist centrifugal port, spring means arranged to assist centrifugal force in closing said escape port, a primary piston area continually exposed to the source of fluid pressure tending to open said escape port, and a secondary piston area, with passage means connecting it with a pressure conduit opposing said primary piston area and responsive to the pressure directed to one of the control ports for closing said escape port.

11. The combination set forth in claim 10 wherein, the pressure control unit includes a lock-out valve operating in response to pressure directed to one of the control ports for exposing said secondary area to a selected value of directed pressure at said control port, thereby stepping up to a predetermined increment, the pressure potential of said source when the governor directs pressure to a selected one of the control ports.

12. The combination set forth in claim 10 wherein the pressure control unit includes a fluid passage connecting said secondary area with the control port for negative pitch adjustment for variably increasing the pressure potential of said source directed to the pitch adjusting provisions for negative pitch.

13. In a propeller control mechanism for use wtih an hydraulically adjustable propeller having provisions for effecting increase and decrease adjustment of the pitch of the propeller blades upon the application of fluid pressure thereto, a rotatable regulator providing a source of fluid pressure, a governor valve having a supply port constantly open to the source of fluid pressure and two control ports selectively connected to the source of fluid pressure in response to variation in speed of propeller rotation, a pressure control valve rotatable with the regulator opening to said fluid pressure source and having a primary area exposed to the source pressure at the said supply port for limiting the pressure of said source to a selected normal value, and having a secondary piston area with a fluid connection between it and both of the control ports to remove the limit on pressure of normal value when the governor valve selectively connects the pressure source with the respective control port.

14. A propeller control mechanism of the character described for use with an hydraulically adjustable propeller having a hub and a plurality of blade sockets, with fluid actuated means for effecting adjustment of the pitch of the blades, comprising, means providing a source of fluid pressure, a pair of fluid pressure conduits for supplying directed fluid pressure to the fluid actuated means, a governor valve having control ports opening into said conduits responsive to the speed of rotation of the propeller for directing the application of said pressure fluid to one or the other of said conduits, and pressure controlling means exposed to said source for maintaining the potential of said source at a normal operating pressure, said pressure controlling means including a housing having a longitudinal bore open at all times to the source potential, a porting sleeve having a bore of lesser diameter secured in one end of the housing bore, and having ports opening from the lesser diameter bore to the exterior of the housing, a plunger movable lengthwise of the housing bore and having a valving piston slidable in the bore of the sleeve, spring means urging the plunger toward one end of the housing bore so that the piston of the plunger closes communication between the bore of the housing and the ports of the sleeve, and means for applying fluid pressure to the piston in aiding relation to spring means.

15. A propeller control mechanism for use with an hydraulically adjustable propeller having fluid actuated means for effecting pitch adjustment of propeller blades, comprising, a pump providing a source of fluid pressure, a pair of control conduits for supplying directed fluid pressure to the fluid actuated means for increasing and for decreasing blade pitch, a governor valve having a pressure supply port and having control ports opening into said conduits operable to connect it to either of the control conduit, a plate rotatable with the propeller and providing a fluid pressure line connecting the fluid pressure source with the pressure supply port of the governor valve, and a variable pressure control valve carried by the plate, and opening into said pressure supply passage for regulating the potential of directed fluid pressure to meet the requirements of the fluid actuated means, said pressure control valve comprising a cylindrical chamber open at all times to the source of fluid pressure and providing a relief port, a plunger movable along the cylindrical chamber and having a piston cooperable with said relief port, means responding to source pressure on said piston tending to open said relief port, spring means acting on the plunger tending to close said relief port, and a fluid pressure feed-back from one of the control conduits to a portion of the piston area opposing the source pressure, and tending to close the relief port when the governor valve connects the said one control conduit with the pressure supply port.

16. The combination set forth in claim 15, wherein means mount the cylindrical chamber radially of the rotatable plate, and centrifugal force acting on the plunger assists the spring and the fluid pressure feed-back in closing the relief port.

17. The combination set forth in claim 15, wherein the fluid pressure feed back from one of the control conduits connects the control conduit for increase pitch adjustment with the said opposing piston area for applying a load control pressure tending to close said relief port and increase the pressure potential in the fluid pressure line.

18. A propeller control mechanism for use with an hydraulically adjustable propeller having fluid actuated means for effecting pitch adjustment of propeller blades, comprising, a pump providing a source of fluid pressure, a pair of control passages for supplying directed fluid pressure to the fluid actuated means for increasing and for decreasing blade pitch, a governor valve having a pressure supply port and operable to connect it to either of the control passages, a plate rotatable with the propeller and providing a fluid pressure line connecting the fluid pressure source with the pressure supply port of the governor valve, and a variable pressure control valve for regulating the potential of directed fluid pressure to meet the requirements of the fluid actuated means, said pressure control valve comprising a body having a cylindrical bore with a plunger movable therein for control of a relief port, means mounting the body so that the cylindrical bore and plunger are radially disposed on the rotatable plate such that the plunger tends to close the relief port under the urge of centrifugal force, spring means acting on the plunger tending to assist centrifugal force to close the relief port, said plunger having a piston face exposed to said cylindrical bore, passage means constantly connecting the fluid pressure line with said cylindrical bore whereby pump pressure is applied to said piston face of the plunger and acts in opposition to the spring force and centrifugal force and tends to open the relief port, and a fluid pressure feed-back connecting with one of the control passages for applying fluid pressure against the plunger in opposition to the pump pressure on the piston face when the governor connects the pressure supply port with said one control passage.

19. A propeller control mechanism for use with a variable load device having a fluid actuated reversible motor for increasing and decreasing the load in response to governor directed fluid pressure from a fluid pressure source, comprising in combination, a rotatable member having a fluid pressure line connecting the pressure source with the said governor, a variable pressure control valve for controlling the potential of pressure in said fluid pressure line to effect a normal operating pressure suitable for governor control at no-change load conditions, and for increasing the potential of pressure in said fluid pressure line to effect an increase over the normal operating pressure suitable to meet the requirements of operation of the reversible motor in changing the load, said pressure control valve providing a cylinder radially disposed of the rotatable member and traversed by source pressure in said fluid pressure line and having a reduced bore with a laterally extending relief port, a headed plunger movable along the cylinder and having a piston adapted to stop fluid flow through the said relief port under the urge of centrifugal force, spring means acting upon the head of said plunger to assist the centrifugal force in closing said relief port, means continuously applying the source pressure of said fluid pressure line to the full area of said piston in opposition to the combined effects of said spring and centrifugal force and tending to open said relief port, the equilibrium of centrifugal force, spring force and source pressure upon said plunger controlling fluid flow through said relief port by said piston to effect said normal operating pressure, and passage means connecting with the reversible motor for applying load changing pressure directed to it upon a portion of the area of the valve piston in opposition to the source pressure upon the full area of the piston, the equilibrium of centrifugal force, spring force and directed load changing pressure on the one hand, balanced against source pressure of the fluid pressure line on the other hand, acting upon said plunger for restraint of relief port opening until the potential of pressure in the fluid pressure line increases sufficiently to satisfy the requirements of the reversible motor in changing the load.

HOWARD CARSON.
RICHARD E. MOORE.

REFERENCES CITED

The following references are of record in the file of this patent:

UNITED STATES PATENTS

| Number | Name | Date |
|---|---|---|
| 2,343,382 | Martin | Mar. 7, 1944 |
| 2,391,699 | Haines et al. | Dec. 25, 1945 |
| 2,402,065 | Martin | June 11, 1946 |